US 8,225,221 B2
Jul. 17, 2012

(12) United States Patent
Beran et al.

(10) Patent No.: US 8,225,221 B2
(45) Date of Patent: Jul. 17, 2012

(54) METHOD AND APPARATUS FOR CONSTRUCTING REPRESENTATIONS OF OBJECTS AND ENTITIES

(75) Inventors: Eric Beran, Copenhagen East (DK); Michael Fruergaard Pontoppidan, Lynge (DK)

(73) Assignee: Microsoft Corporation, Redmond, WA (US)

( * ) Notice: Subject to any disclaimer, the term of this patent is extended or adjusted under 35 U.S.C. 154(b) by 1456 days.

(21) Appl. No.: 10/822,444

(22) Filed: Apr. 12, 2004

(65) Prior Publication Data

US 2005/0228826 A1    Oct. 13, 2005

(51) Int. Cl.
  G06F 9/44    (2006.01)
  G06F 3/00    (2006.01)
  G06F 3/048   (2006.01)
(52) U.S. Cl. .......................... 715/762; 715/222; 717/102
(58) Field of Classification Search ................... 715/735, 715/734, 736, 744, 746, 747, 717, 762, 222, 715/853, 854; 777/999.102; 717/999.102
See application file for complete search history.

(56) References Cited

U.S. PATENT DOCUMENTS

| 5,615,367 | A  | * | 3/1997 | Bennett et al. | 715/700 |
| 5,627,979 | A  |   | 5/1997 | Chang et al. | 395/335 |
| 5,809,297 | A  | * | 9/1998 | Kroenke et al. | 715/835 |
| 6,108,664 | A  |   | 8/2000 | Nori et al. | |
| 6,240,422 | B1 | * | 5/2001 | Atkins et al. | 719/315 |
| 6,563,522 | B1 |   | 5/2003 | Rosen et al. | 345/854 |
| 6,636,242 | B2 | * | 10/2003 | Bowman-Amuah | 715/764 |
| 6,738,077 | B1 | * | 5/2004 | Wendker et al. | 715/744 |
| 7,243,334 | B1 | * | 7/2007 | Berger et al. | 717/109 |
| 7,337,411 | B1 | * | 2/2008 | Racine et al. | 715/780 |
| 7,475,333 | B2 | * | 1/2009 | Otter et al. | 715/222 |
| 7,827,502 | B2 | * | 11/2010 | Scheu et al. | 715/765 |
| 7,895,563 | B2 | * | 2/2011 | Carlson et al. | 717/102 |
| 2003/0063124 | A1 | * | 4/2003 | Melhem et al. | 345/777 |
| 2004/0085357 | A1 | * | 5/2004 | Childress et al. | 345/762 |
| 2005/0235248 | A1 | * | 10/2005 | Victoria et al. | 717/102 |

FOREIGN PATENT DOCUMENTS

| JP | 05-204652 | 8/1993 |
| JP | 06-324876 | 11/1994 |
| JP | 10-171657 | 6/1998 |

OTHER PUBLICATIONS

Demuth, et al., OCL as a Specification Language for Business Rules in Database Applications, Jan. 1, 2001 Lecture Notes in Computer Science, vol. 2185.*
Tichellar et al., S., "An Exchange Model for Reeingineering Tools", 12th European Conference on Object-Oriented Programming Brussels, Belgium, Jul. 20-24, 1998.

(Continued)

*Primary Examiner* — Jordany Nunez
(74) *Attorney, Agent, or Firm* — Joseph R. Kelly; Westman, Champlin & Kelly, P.A.

(57) ABSTRACT

A method of constructing a representation of an object having at least one property includes identifying at least one property group associated with the object which has been chosen to represent the object. At least one property of the object belongs to each property group identified as being associated with the object. The method further includes identifying any other object that the object references within a property of an identified property group. An object representation engine retrieves data corresponding to each of the properties belonging to the at least one property group. The engine then represents the object using the retrieved data.

16 Claims, 7 Drawing Sheets

OTHER PUBLICATIONS

Tomek, I., "Chapter 1—Object-oriented programming—essential concepts", Chapter I, Introduction to Smalltalk, Sep. 17, 2000.
Bry et al., F., "Towards Grouping Constructs for Semistructured Data", Technical Report PMS-FB-2001-7, Computer Science Institute, Munich, Germany, May 2001.
Chinese Patent Application No. 200480001674.8 Notice on Reexamination date of Dispatch, Dec. 14, 2010, 6 pages.
Japanese Patent Application No. 2007-507294 Notice of Rejection mailed on Nov. 30, 2010, 10 pages.
Korean Patent Application No. 10-2005-7008340 Office Action dated Jan. 13, 2011, 3 pages. (Korean text).
Chinese Patent Application No. 200480001674.8 Second Office Action date of Dispatch Mar. 5, 2009, 13 pages.
Chinese Patent Application No. 200480001674.8 Decision on Rejection, Date of Dispatch May 16, 2008, 10 pages.
Chinese Patent Application No. 200480001674.8 Decision on Rejection Jul. 17, 2009, 10 pages.
EP Patent Application No. 04 757 234.2-1238 Communication pursuant to Article 94(3) EPC dated Jun. 23, 2008, 5 pages.
Japanese Patent Application No. 2007-507294 Notice of Rejection mailed on Jul. 27, 2010. 11 pages. (6 pages English text, 5 pages Japanese text).
Korean Patent Application No. 10-2005-7008340 Notice of Preliminary Rejection dated Sep. 26, 2011. 3 pages.
Chinese Patent Application No. 200480001674.8 Notice of Third Office Action dated Feb. 13, 2012.

* cited by examiner

METHOD AND APPARATUS FOR CONSTRUCTING REPRESENTATIONS OF OBJECTS AND ENTITIES

BACKGROUND OF THE INVENTION

The present invention is related to object oriented programming. More particularly, the present invention is related to methods and apparatus for constructing a representation of an object.

Object oriented programming languages are in wide use by programmers in a range of applications. In object oriented programming languages, objects have a number of properties or property fields. Some objects tend to have a large number of these properties. Some of the properties of an object can have a type that in itself is an object. Therefore, through a reference point to another object, these properties point to even more properties.

When building a user interface (UI), such as a form, table, spreadsheet, or other visual representation based on the properties of an object and their references, it can be quite cumbersome to have to specify each individual property to be included in the representation. This is especially true if the requested property is on a referenced object. The problem becomes even more complicated if the object is derived from another object.

For a typical application or system, it is common for there to be a need to generate hundreds, if not thousands, of different UIs (for example as forms) or other representations for the large number of different objects and/or combinations of properties which are to be visually represented. Generating the large number of visual representations can thus be a very labor intensive process. Further, modification of these representations is also cumbersome. If modification to existing representations is required, for example to reflect additional properties added to objects, much of the effort put into creating them in the first place must be repeated. As a result, for a system which is programmed and installed for an end user, it is often times very difficult for the end user to customize the UIs, forms or other representations at a later time if desired.

SUMMARY OF THE INVENTION

A method of constructing a representation of an object having at least one property includes identifying at least one property group associated with the object which has been chosen to represent the object. At least one property of the object belongs to each property group identified as being associated with the object. Alternatively stated, the property groups associated with the object can be described as being assigned to at least one of the properties of the object. The method further includes identifying any other object that the object references within a property of an identified property group. An object representation engine retrieves data corresponding to each of the properties belonging to the at least one property group. The engine then represents the object using the retrieved data. The step of representing the object frequently includes visually representing the object by displaying the retrieved data.

In some embodiments, the step of displaying the retrieved data further comprises displaying names of properties in the at least one property group adjacent values of those properties. A name of each property group can be displayed adjacent the names of the properties in that property group and adjacent the values of those properties.

In some embodiments of the invention, at least one object inheritance hierarchy exist between the object and other objects. Each property group is unique to a particular object inheritance hierarchy. In some embodiments, the object is a specialization of a second object. The object can then inherit the property groups associated with the second object.

In some embodiments, each property group is assigned to at least one of the properties of the object and to one or more properties of only one other object. The step of retrieving data corresponding to each of the properties to which the property group is assigned can then further comprise retrieving the data corresponding to properties of the first object and to properties of the only one other object associated with the property group.

In some embodiments, the step of identifying the at least one property group associated with the object further comprises identifying a default property group associated with the object.

Other features and benefits that characterize embodiments of the present invention will be apparent upon reading the following detailed description and review of the associated drawings.

DETAILED DESCRIPTION OF ILLUSTRATIVE EMBODIMENTS

As discussed above, in object oriented programming, objects and entities contain properties, and through hierarchies and other relationships point to properties of other objects. An entity can be described as a persistable object. In other word, an entity is an object which can be stored in a database. As used herein, the term "object" is intended to include "entities". General concepts of object oriented programming, for example the concepts of inheritances, associations, and compositions, are known in the art. For example, see "UML Distilled: A Brief Guide to the Standard Object Modeling Language," by K. Scott and M. Fowler (Addison-Wesley 1999).

The present invention is based, in part, upon the recognition that properties of objects connected using associations or inheritance allows a user interface (UI), form, or other representation of the object(s) to be more easily specified. The methods and apparatus of the present invention, which utilize grouping of properties, facilitate the fast construction of UIs and other representations when the objects are complex in terms of inheritance, customization and associations. In the prior art, it is common for every UI, form, web-page or other representation of data from objects to have to be revisited every time an extension is made to the objects. Using the methods and apparatus of the present invention, extensions can be made to objects without the need for the labor intensive task of updating these UIs, forms, web-pages or other representations of the objects.

Figure 1:
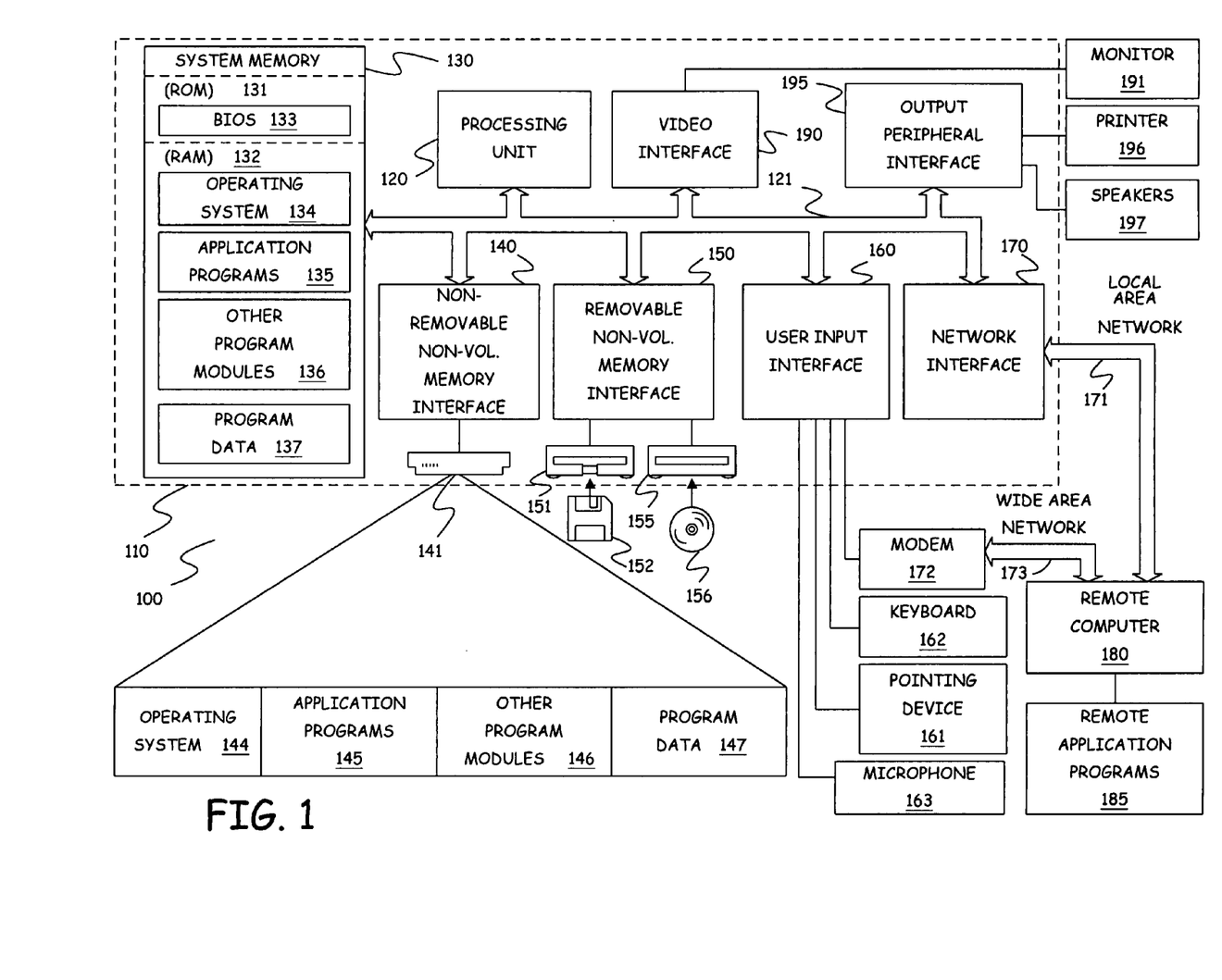
FIG. 1 is a block diagram of one exemplary environment in which the present invention can be implemented.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
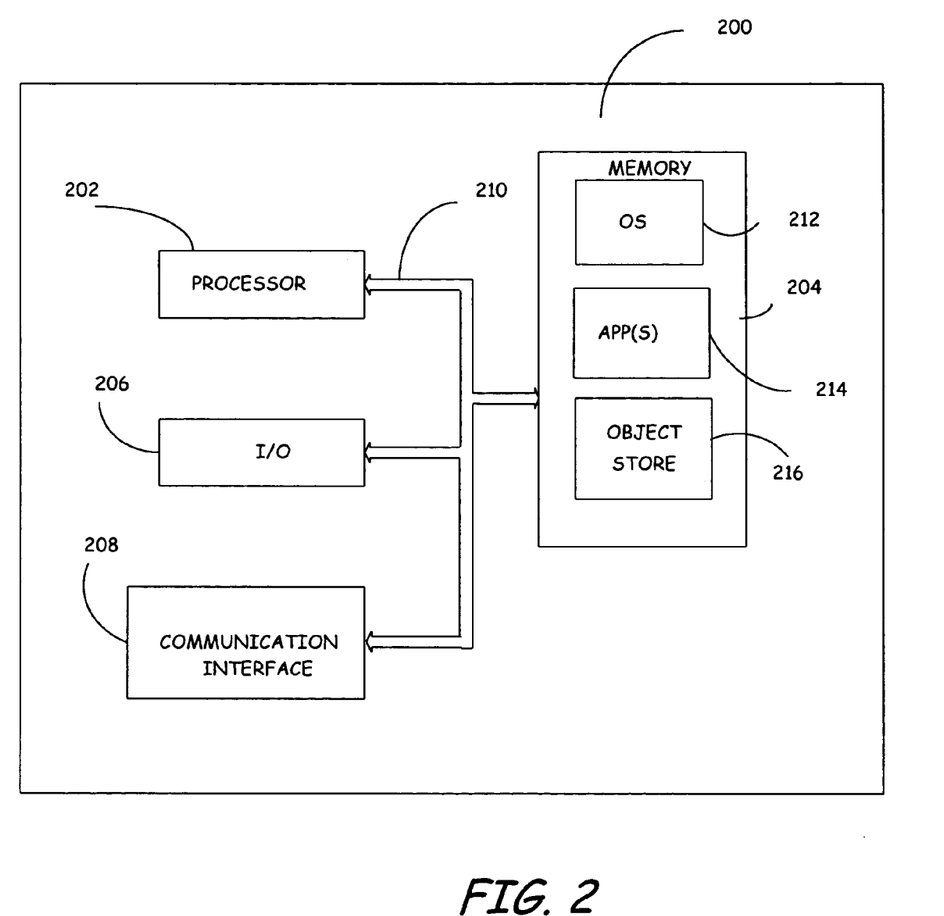
FIG. 2 is a block diagram of a general mobile computing environment in which the present invention can be implemented.

FIG. 2 is a block diagram of a mobile device 200, which is an alternative exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200.

Figure 3:
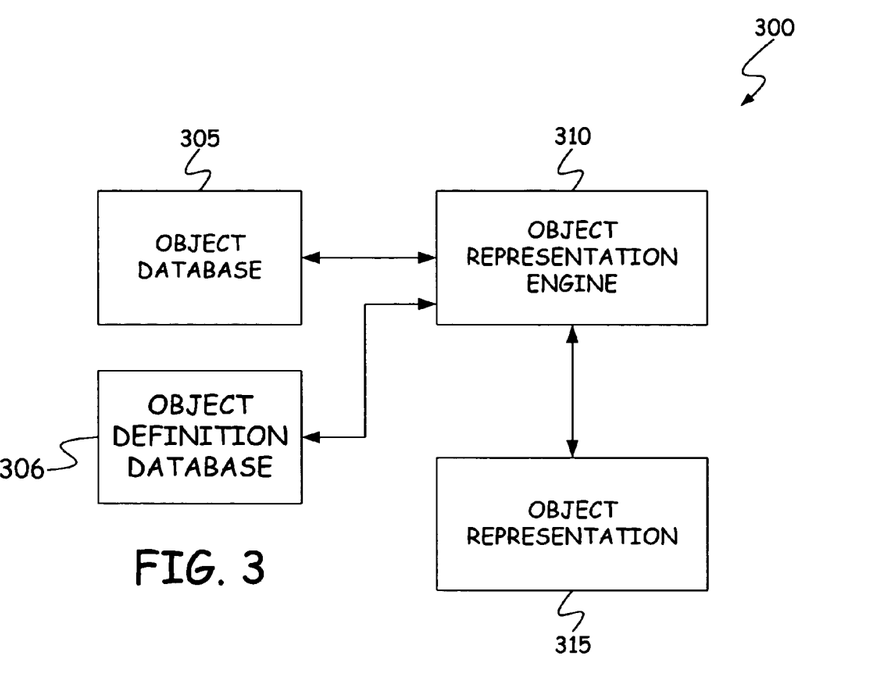
FIG. 3 is a block diagram illustrating an object representation system in accordance with embodiments of the present invention.

Referring now to FIG. 3, shown is a block diagram illustrating an object representation system 300 in accordance with embodiments of the present invention. Object representation system 300 includes an object database 305 in which data for populating object instances is stored. System 300 also includes an object definition database 306 which contains data or information which defines the objects, property types, etc. Object representation engine 310 generates instances of objects by looking up object representation data from database 306, and then populating the object instances with data from database 305.

The objects defined using databases 305 and 306 have property groups associated with the properties of the objects. As noted above, the association of a property group with the properties of objects can be described in terms of the properties belonging to the property group, or in terms of the property group being assigned to the properties. Both descriptions are accurate. Using these properties groups, object representation engine 310 identifies which properties of one or more objects are to be represented, and retrieves the data corresponding to those properties. Object representation engine 310 then generates an object representation 315. Object representation 315 can be, for example, a visual representation of one or more objects on a display device, on printed pages, etc. Examples of visual representations include UIs, forms, tables, spreadsheets, web pages, to name just a few. Non-visual representations based upon the property groups of the present invention are also possible. The manner in which property groups are associated with the objects, and the manner in which object representation engine 310 uses the property groups to generate an object representation, are described below in detail with reference to FIGS. 4-9.

Given a set of objects connected using associations, inheritance, compositions or customizations, each object typically has at least several properties that either represent the simple type (e.g., int/string) or references to other objects. For each object, a group name can be assigned to each property. The group name should be unique per object inheritance hierarchy. For each object, a group can be marked as the default group indicating that this set of properties is the preferred representation of the object. A user interface can then be constructed by specifying which groups represent the object. If a group contains a property that is a reference to another object, then this object is represented as the default group of that other object.

Figure 4:
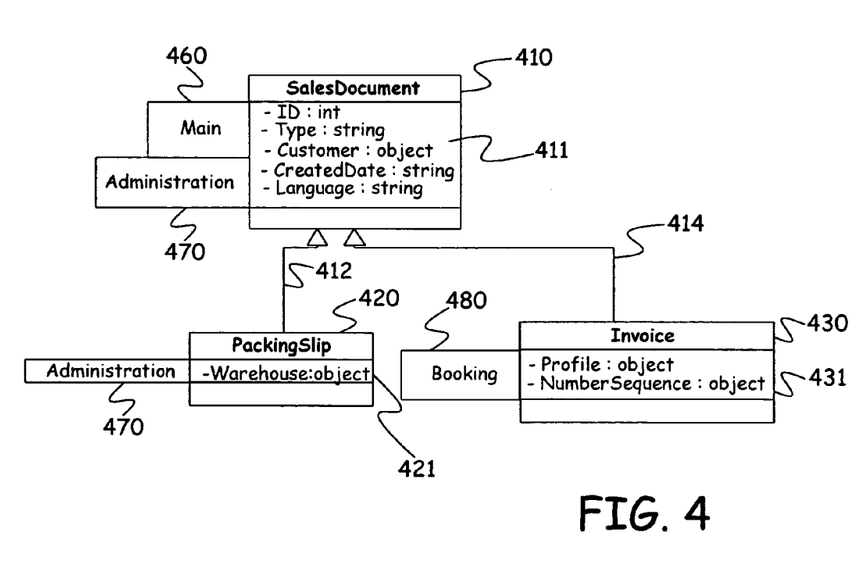
FIG. 4 is a block diagram illustrating objects in hierarchical relationships, and illustrating the property group concepts of the present invention.
Figure 5:
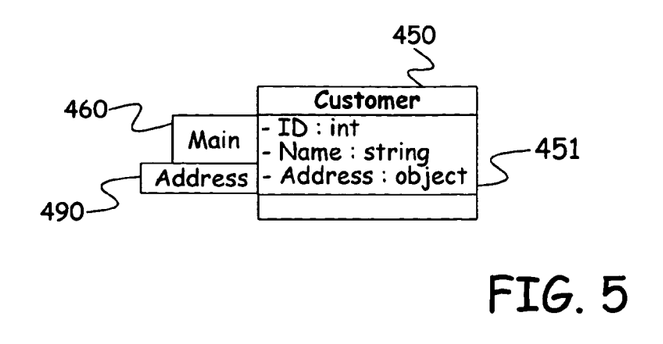
FIG. 5 is a block diagram illustrating an object which has an association relationship with an object shown in FIG. 4, and which shares a property group with that object.

FIGS. 4 and 5 illustrate an example of object hierarchies and references. Shown in FIG. 4 are three objects, SalesDocument 410, PackingSlip 420 and Invoice 430. The PackingSlip object 420 and the Invoice object 430 are related to the SalesDocument object 410 by inheritance hierarchies 412 and 414, respectfully. In other words, PackingSlip object 420 and Invoice object 430 are specializations of SalesDocument object 410. Alternatively stated, SalesDocument object 410 is a generalization of PackingSlip object 420 and Invoice object 430.

SalesDocument object 410 includes five properties or property fields shown at 411 in FIG. 4. In this example, the first and second properties of SalesDocument object 410 include an "ID" property and a "Type" property. The values of these properties are represented in FIG. 4 based upon the type of data included in these values. For example, the ID property is represented as an integer (int) value, while the Type property is represented as a string value. Examples of the string values which fill the Type property field include, in this example, "PackingSlip" and "Invoice." Other examples of the Type property or property field could include "Quotation," "Confirmation," "Receipt," etc.

The third property of the SalesDocument object 410, the Customer property, is actually a pointer to another object. The Customer object 450, to which this property of SalesDocument object 410 points, is shown in FIG. 5. The first three properties of the SalesDocument object 410 have been assigned the property group "Main" 460. The Main property group 460 is, in an example embodiment, the default property group. Any of a wide variety of different methods can be used to designate which property group is the default property group. As will be discussed below in greater detail, by assigning the first three properties of the SalesDocument object 410 to the Main property group 460, the property value information associated with these properties can conveniently be displayed together by including a pointer to the Main property group for generating a visual representation of the object 410.

The final two properties or fields of the SalesDocument object are "CreatedDate" and "Language," both having string values. Since these two fields are both administrative in nature, one might want to see them together on a form or other visual representation. To facilitate this, these two properties are each included in a second property group, the "Administration" property group 470, shown in FIG. 4.

In the example illustrated in FIG. 4, there are two specializations of the SalesDocument object 410, the PackingSlip object 420 and the Invoice object 430. The PackingSlip object 420 includes a single property, represented at reference number 421, entitled "Warehouse" having as a value a pointer to another object. The Warehouse object pointed to in the property field of the PackingSlip object 420 is not shown, but would be used to designate which of multiple warehouses an item was sent from or should be delivered to. In this example, the Warehouse property 421 is included in the Administration property group 470.

For the SalesDocument specialization Invoice object 430, there exists two properties or property fields, represented at reference number 431, the "Profile" property and the "NumberSequence" property. Both of the properties of Invoice object 430 are pointers to other objects (not shown). Each of these properties is included in a third property group, the "Booking" property group 480.

Referring again to FIG. 5, the "Customer" object 450 includes three properties shown at reference number 451. The first two properties, a Customer "ID" having an integer value and a Customer "Name" having a string value, are included in the Main or default property group 460. The third property of the Customer object 450 is entitled "Address", which is a pointer to another object (not shown). This third property of Customer object 450 is included in a property group 490 entitled "Address."

Using the property group concepts of the present invention, the UI or other representation of an object is defined or created simply by specifying which property groups should be on the form or representation. The object representation engine 310 shown in FIG. 3 then looks up the contents of those property groups in database 305, including properties from multiple objects to which the property groups are assigned, and displays those fields. In some exemplary embodiments, the properties of particular property groups are displayed together on the visual representation of the object. The names of properties in the property group are matched to a control on the representation, while the values of those properties are mapped to a corresponding value field.

Figure 6:
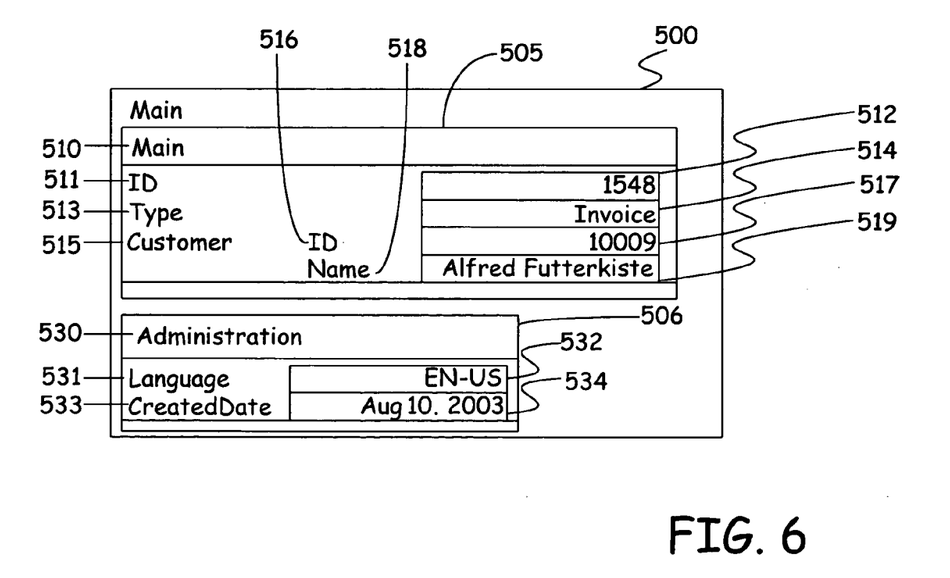
FIG. 6 is a diagrammatic illustration of a user interface (UI) specified by object and created using the property group concepts of the present invention.

FIG. 6 is a diagrammatic illustration of a UI, form or other visual representation 500 for the SalesDocument object 410 shown in FIG. 4. This UI 500 is defined for the SalesDocument object 410 by specifying that the Main (i.e., SalesDocument.Main) property group 460 and the Administration (i.e., SalesDocument.Administration) property group 470 should be on the form. The object representation engine 310 looks up the contents of the property groups from database 305, and displays those fields on UI 500. When object representation engine 310 detects the Customer property as being part of the Main or default property group on the SalesDocument object 410, it goes to the Customer object 450 and finds the default property group (Main) 460 and displays those corresponding fields as well.

As shown in FIG. 6, in UI or form 500, the name of Main property group 460 is mapped to a control 510 which visually represents the name of this property group. Likewise, the ID, Type and Customer properties from SalesDocument object 410 which are in the Main property group 460 are also mapped to controls 511, 513 and 515, respectively, to visually display the names of these properties on UI 500. The values of the first two properties in the Main property group 460 of SalesDocument object 410 are mapped into fields 512 and 514 which visually correspond to controls 511 and 513. Thus, the SalesDocument is illustrated as having an ID number "1548", and a type "Invoice". Since the Customer property of the SalesDocument object 410 in the Main property group 460 is a pointer to the Customer object 450 shown in FIG. 5, the object representation engine 310 maps the name "Customer" of this property to control 515, and the names of the corresponding properties "ID" and "Name" from object 450 to controls 516 and 518. The values of those properties from Customer object 450 are then mapped to value fields 517 and 519, respectfully. Thus, the Customer object referred to in the SalesDocument object 410 is identified by a Customer ID of "10009" and a Customer Name of "Alfred Futterkiste". In some embodiments, the controls (510, 511, 513, 515, 516 and 518) and the corresponding mapped values (512, 514, 517 and 519) in UI 500 corresponding to the Main property group 460 are visually grouped using a border or other visual delineator 505.

Similarly, since the Administration property group 470 was designated as being part of the representation of the SalesDocument object 410, it's property and property group names are mapped to controls 530, 531 and 533 in UI 500. The corresponding values of those properties are mapped to value fields 532 and 534. Thus, it can be seen that the SalesDocument object 410 was created on Aug. 10, 2003, and that the language is United States English. Again, if desired, a boarder or other delineator 506 can be used to visually group the property names and values of the Administration property group 470. Note that, in this embodiment, since neither of the "CreatedDate" or "Language" properties from SalesDocument 410 include pointers to another object, no further properties were retrieved for inclusion in the Administration portion of UI 500.

In some embodiments of the invention, when using inheritance, the property groups are inherited as well. However, more properties can be added to the same property group. For example, referring to FIG. 7, to define a UI, form or visual representation 550 for the PackingSlip object 420, the properties Main 460 and Administration 470 can again be specified. In the alternative, in other embodiments, the property groups used to define the PackingSlip object 420 can simply be inherited from SalesDocument object 410, since these two property groups have previously been designated for use in visually representing the SalesDocument object. In these embodiments, it would only be necessary to specify any additional property groups which are to be displayed as part of the visual representation of the PackingSlip object 420. In the example illustrated in FIG. 4, there are no additional property groups which are distinct from those used to represent SalesDocument object 410.

Figure 7:
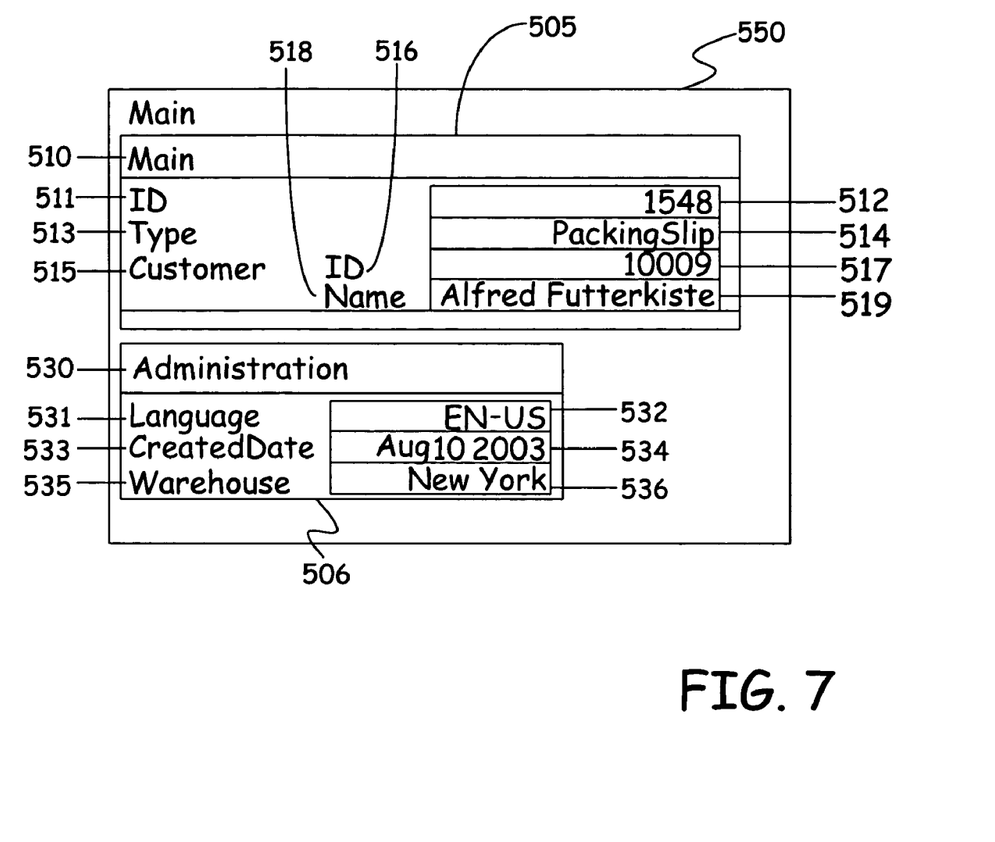
FIG. 7 is a diagrammatic illustration of a second UI specified by object and generated using the property group concepts of the present invention.

The UI 550 used to visually represent PackingSlip object 420 is very similar to UI 500 used to visually represent SalesDocument object 410. One difference can be seen in value field 514 corresponding to the Type property mapped to control 513. In this instance, the value of the string of this property has changed from "Invoice" to "PackingSlip". Another difference between UI 550 and UI 500 relates to additional properties of the Administration property group 470. Since the PackingSlip object 420 includes a Warehouse property (shown as 421 in FIG. 4) in the Administration property group 470, object representation engine 310 retrieves this data from database 305 as well. Thus, the Administration property group information displayed in UI 550 includes the name "Warehouse" of this property mapped to control 535. Since the Warehouse property in the PackingSlip object is a pointer to another object, the value "New York" mapped to property field 536 is retrieved from this other object in database 305.

As noted above, defining which property groups are to be visually represented in a UI for a particular object can be done in a number of ways. For example, each of the property groups can be specifically listed for object representation. Alternatively, the objects can inherit the property groups used to visually represent that object's generalization. Further, property groups can also be listed in addition to those which are inherited. For example, for the Invoice property group 430 it might be further specified that the "Booking" property group 480 is also to be used in the visual representation, in addition to those property groups inherited from the SalesDocument object 410.

The use of property groups in general, and in particular default property groups which pull in properties from associations and compositions as well, provides a greatly improved manner of generating visual and other representations of an object or entity. For each particular different type of form or visual representation to be generated, which can number in the hundreds or even thousands, all that is necessary is that the property groups which are to represent a particular object be specified. To change a particular form or visual representation to include other properties of other property groups, it would only be necessary to change the property groups which are specified for use in representing the object. Further, if properties of an object are changed, added or deleted, using the concepts of the present invention it is not necessary to revise each of a large number of forms or visual representations which have been previously created. Instead, for the object which has a change, addition or deletion of properties, the property groups must be redefined. Thus, the present invention provides both a method and apparatus for facilitating the fast construction of UIs when objects are complex in terms of inheritance, customization, and association, as well as a method and apparatus for revising object properties without the need to revisit every form, web page, UI or other visual representation which presents data from the objects in question.

Figure 8:
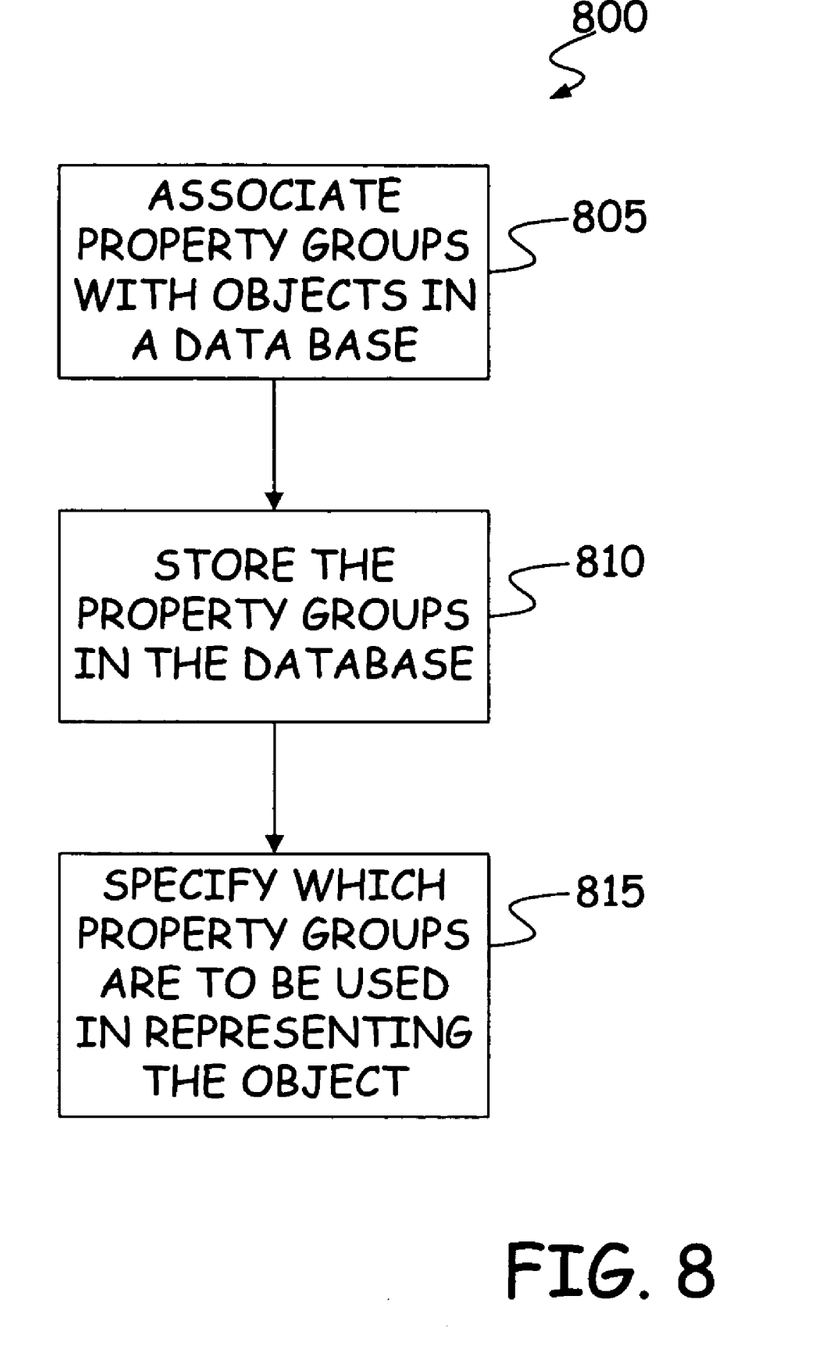
FIG. 8 is a flow diagram illustrating a method in accordance with the present invention.

FIG. 8 is a block diagram 800 illustrating a method of storing data in a database, for example databases 305 and/or 306 shown in FIG. 3. This method allows representations of objects to be constructed using the concepts of the present invention. As shown at 805 in FIG. 8, the method includes associating property groups with objects in a data base. In one manner of expression, this can be thought of as the property groups being stored next to the object definition in database 306, with only data instances stored in 305. As discussed above, each property group associated with an object includes at least one property of the object. Next, as shown at 810, the method includes storing the property groups in the database. Finally, as shown at 815, the method includes specifying which property groups are to be used in representing the object. In one example embodiment, the "Main" property group is the default property group for representing the object. Other aspects of the method shown in FIG. 8 are described above with reference to FIGS. 3-7.

Figure 9:
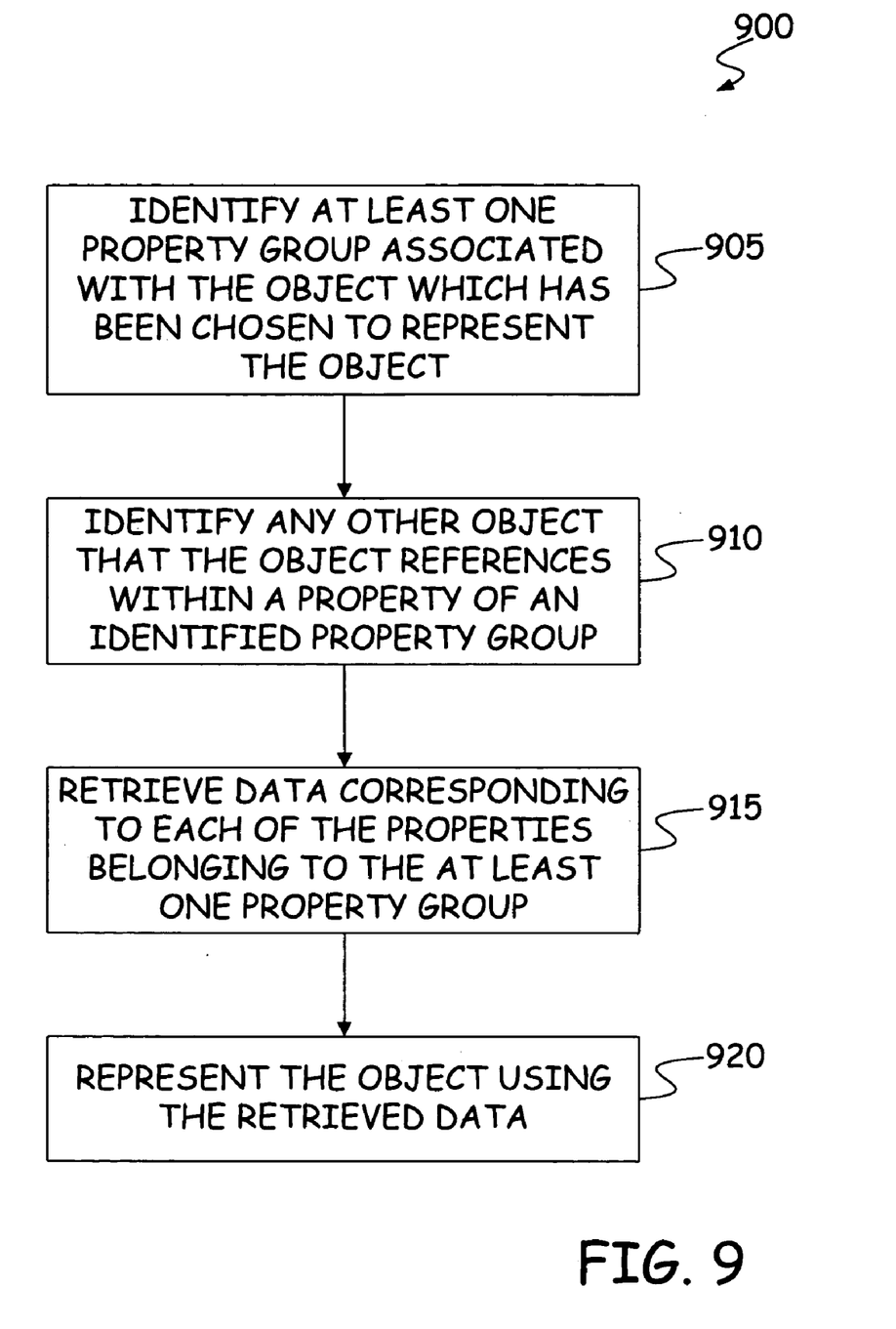
FIG. 9 is a flow diagram illustrating a further method in accordance with the present invention.

FIG. 9 is a block diagram 900 illustrating a method of constructing a representation of a particular object in a database. The method shown in FIG. 9 is an embodiment of the methodology described above with reference to FIGS. 3-7, and can be implemented by object representation engine 310. First, as shown at 905, the method includes identifying at least one property group associated with the object which has been chosen to represent the object. At least one property of the object will belong to each property group associated with the object.

As shown at 910, the method further includes identifying any other object that the particular object references within a property of an identified property group. Then, as shown at 915, the method includes retrieving data corresponding to each of the properties belonging to the one or more identified property groups. The data can be retrieved, for example, from database 305 shown in FIG. 3. Finally, as shown at 920 in FIG. 9, the method includes representing the object using the retrieved data. The representation of the object can be a visual representation in which the retrieved data is displayed next to names of the properties, and if desired, names of the property groups to which the properties belong as is illustrated in FIGS. 6 and 7.

Although the present invention has been described with reference to particular embodiments, workers skilled in the art will recognize that changes may be made in form and detail without departing from the spirit and scope of the invention.

What is claimed is:

1. A method comprising:
  defining a business related object that is associated with object oriented programming in an object definition database by associating the business related object with a plurality of properties;
  identifying at least a first property group including a first set of the plurality of properties that has a customer property that is a reference to a customer object that has customer properties identifying a customer, and a second property group including a second set of the plurality of properties, the first and second sets being different from one another and being properties of the business related object such that displaying different ones of the first and second property groups results in a different visual representation of the same business related object;

associating the first and the second property groups with the business related object in the object definition database;

specifying to a representation engine the first property group to represent the business related object on a visual display;

utilizing the representation engine and the object definition database to retrieve data corresponding to a property name and value for each of the properties belonging to the first property group, and also retrieving a default set of the customer properties; and displaying on the visual display on a user interface a representation of the business related object that includes a display of the first property group and not the second property group, the display of the first property group including a display of a name of the customer object and the default set of the customer properties.

2. The method of claim 1, wherein the step of displaying comprises visually displaying the name and value for each property in the first property group.

3. The method of claim 2, wherein the step of displaying further comprises displaying the names of properties belonging to the first property group adjacent values of those properties.

4. The method of claim 3, wherein displaying names of properties belonging to the first property group further comprises displaying a name of first property group adjacent the names of the properties belonging to the first property group and adjacent the values of those properties.

5. The method of claim 1, wherein the object has a parent object that has a specified property group wherein displaying a representation of the object comprises displaying the object using the first property groups and the specified property group of the parent object.

6. The method of claim 1, and further comprising:
identifying any other object that the object references within a property of the first property group, the other object having a default property group wherein at least one object inheritance hierarchy exists between the object and the other identified objects, and wherein each property group is unique to a particular object inheritance hierarchy.

7. The method of claim 6, wherein the object is a specialization of a second object, and wherein the object inherits the property groups associated with the second object.

8. The method of claim 6, wherein for each property group, properties belonging to the property group include at least one property of the object and one or more properties of only one other object.

9. The method of claim 1, wherein specifying the first property group associated with the object further comprises identifying the first property group as a default property group associated with the object.

10. The method of claim 1 wherein displaying comprises:
displaying the properties in the first property group with a border to visually separate properties in the first property group from other displayed properties.

11. A computer implemented method of displaying a sales document object using a computer with a processor, comprising:

identifying, with the processor, a plurality of different property groups for the sales document object, a first property group of the plurality of different property groups including at least customer properties related to a customer and a second property group of the plurality of different property groups including at least administrative properties specifying creation details corresponding to the creation of the sales document object;

storing indications of the sales document object, the different property groups, and value types for the different property groups in an object definition database, the value types including an integer type, a string type, and an object type;

storing specific values corresponding to the value types in an object database;

specifying, to a representation engine implemented by the processor, that the sales document object is to be represented on a user interface display by a given subset of the plurality of different property groups;

retrieving, with the representation engine, property names for properties in the given subset of the plurality of different property groups from the object definition database;

retrieving, with the representation engine, the specific values for the properties in the given subset of the plurality of different property groups from the object database; and displaying on the user interface display, a representation of the sales document object, the representation having displayed properties including properties in the given subset of the plurality of different property groups and not properties in other property groups of the plurality of different property groups, not in the given subset, wherein displaying includes visually grouping together properties in each of the property groups in the given subset to visually separate each of the property groups in the given subset from one another on the user interface display.

12. The computer implemented method of claim 11 wherein visually grouping together properties comprises:
displaying a visual border around properties in each of the property groups in the given subset to visually separate each of the property groups in the given subset from one another.

13. The computer implemented method of claim 12 wherein visually grouping together properties comprises:
displaying, adjacent one another and within the visual border, the names and values of the properties in each property group in the given subset.

14. The computer implemented method of claim 11 wherein a given property in a property group in the given subset of property groups comprises a reference to a second business object, other than the sales document object, and wherein the displayed properties include a predetermined subset of properties of the second business object and not other properties of the second business object other than the predetermined subset of properties.

15. The computer implemented method of claim 14 and further comprising:
identifying properties of the second business object, that are previously marked as default properties, as the predetermined subset of properties of the second business object.

16. The computer implemented method of claim 15 and further comprising:
retrieving property names and values for the default properties of the second business object.

* * * * *